United States Patent [19]

Amao

[11] Patent Number: 5,188,278

[45] Date of Patent: Feb. 23, 1993

[54] FRICTION WELDING METHOD FOR JOINING A RIM AND A DISC OF A DISC WHEEL AND THE APPARATUS THEREFOR

[75] Inventor: Tsutomu Amao, Tokyo, Japan

[73] Assignee: A & S Corporation, Tokyo, Japan

[21] Appl. No.: 710,199

[22] Filed: Jun. 3, 1991

[30] Foreign Application Priority Data

Nov. 22, 1990 [JP] Japan .................. 2-315992

[51] Int. Cl.⁵ .......................................... B23K 20/12
[52] U.S. Cl. ..................... 228/112; 228/114; 228/212; 228/2; 228/44.3; 301/96
[58] Field of Search ................. 228/112–114, 228/212, 2, 44.3, 44.5; 156/73.5; 29/894, 322; 301/95, 96

[56] References Cited

U.S. PATENT DOCUMENTS

| | | | |
|---|---|---|---|
| 3,273,233 | 9/1966 | Oberle et al. | 228/113 |
| 3,611,535 | 10/1971 | Nobach | 228/112 |
| 4,063,676 | 12/1977 | Lilly | 228/114 |
| 4,106,172 | 8/1978 | Bache | 228/112 |
| 4,213,554 | 7/1980 | Sciaky | 228/2 |
| 4,387,844 | 6/1983 | Frank | 228/113 |

FOREIGN PATENT DOCUMENTS

| | | |
|---|---|---|
| 0054931 | 12/1981 | European Pat. Off. . |
| 3205235 | 9/1983 | Fed. Rep. of Germany . |
| 55-109586 | 8/1980 | Japan . |
| 1-138080 | 5/1989 | Japan . |
| 1-154888 | 6/1989 | Japan . |
| 1-168501 | 7/1989 | Japan . |
| 1-172001 | 7/1989 | Japan . |
| 1505832 | 3/1978 | United Kingdom . |

OTHER PUBLICATIONS

Pages 17–29, Welding Journal, Jul. 1983.

Primary Examiner—Samuel M. Heinrich
Attorney, Agent, or Firm—Jordan and Hamburg

[57] ABSTRACT

A friction welding method for joining a rim and a disc of a disc wheel and an apparatus therefore wherein an outside material or a rim and an inside material or a disc, each of which is a component of a disc wheel, are joined together. This friction welding apparatus comprises, typically, a mechanism for fixing firmly the circumference of one material almost entirely circumferentially, a mechanism for rotating another material, a mechanism for generating frictional heat between the two materials, with the inside material fitted into the outside material, by pressurizing the rotated material to the fixed material. This method employs a lap joint process instead of a butt joint process. Either or both of the materials can be provided with a projection on the circumference. A projection absorbs the turning force, inertia force and braking force produced at the time of joining operation to prevent the above forces from being concentrated on a local portion of the materials in process. This prevents the finished products from deformation.

17 Claims, 8 Drawing Sheets

FRICTION WELDING METHOD FOR JOINING A RIM AND A DISC OF A DISC WHEEL AND THE APPARATUS THEREFOR

INDUSTRIAL FIELD OF THE INVENTION

The present invention relates to a method for friction welding for joining a rim and a disc by way of a lap joint process and the apparatus therefor. This technology is particularly suited to joining a rim and a disc to manufacture a disc wheel to be mounted on a vehicle.

STATEMENT OF THE PRIOR ART

Mainly steel and aluminum alloy disc wheels for vehicles are now on the market. Almost all the steel disc wheels are of two-piece type. They are made of a rim and a disc joined together. Conventionally an arc welding method through a fillet welding process has principally been employed to form such a two-piece type disc wheel assembled from the rim and the disc. However, this method is time-consuming.

On the other hand, the aluminum alloy disc wheel assembled by arc welding was apt to cause small pores and cracks in the joint formed between the rim and the disc. Accordingly a forging or casting method was used to form an integrated one-piece disc wheel.

It was impossible for the forging or casting method to keep good dimensional accuracy This forced the forged or cast disc wheel to be subjected to machining for the improvement of accuracy The machining process caused the manufacturing cost to be pushed upward by the amount corresponding to the process. To make matters worse, this caused the yield rate of the material to be aggravated.

Incidentally, there is a joining method called a friction welding method which can realize shorter processing time and good dimensional accuracy. Several joining methods have been developed in which the friction welding method is employed to join the rim and the disc together. Japanese Patent Laid-Open Publication No. 55-109586, for instance, shows the technology in FIG. 2. Namely, this is a technology wherein the stepped portion in the middle of the rim is butted against the outer periphery of the disc to perform friction welding at the butted portion. Japanese Patent Laid-Open Publication Nos. 1-138080, 1-154888, 1-168501 and 1-172001 also teach the technology wherein the rim and the disc are joined together by the friction welding method, respectively. All of these technologies are based on the friction welding method through the butt joint process.

Figure 2:
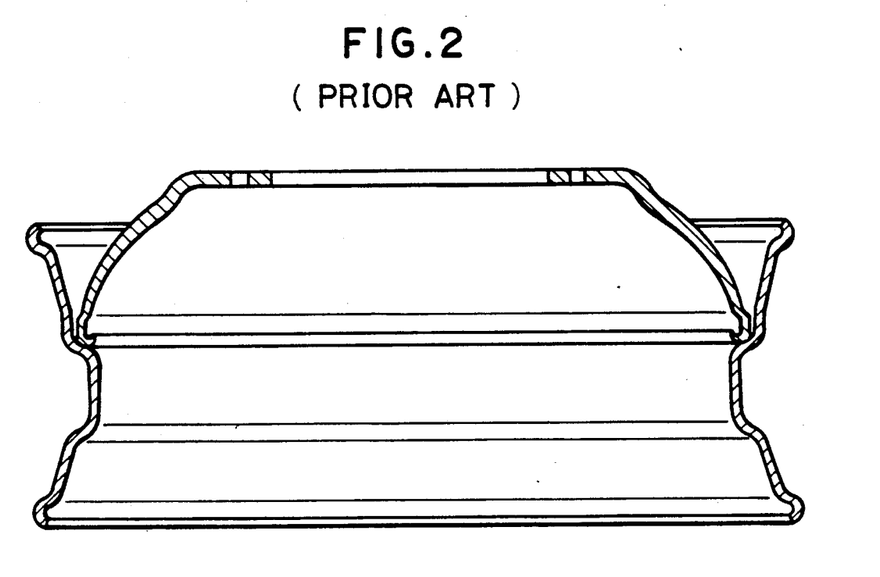
FIG. 2 is a longitudinal sectional view showing a conventional disc wheel.

It is certain that the friction welding method is an excellent joining method. But the butt joint process adopted together with the friction welding method causes another disadvantage. FIG. 2 is the case of a product wherein a face of the disc on which the disc wheel is to be mounted on the vehicle is connected to the primary driving side so that the disc can be rotated by the primary driving. The outer periphery of the disc is pressed against the stepped portion of the rim for joining. At the time of the friction welding process, a large turning force and inertia force are applied in one direction to the disc, while a large braking force is generated in the reverse direction on the joining faces. Further, at the time of the upset pressure applying process, the pressure is applied to the joining faces. While the disc is in these processes, the disc is not supported from anywhere except the face of the disc on which the disc wheel is to be mounted on the vehicle. This causes the disc to be easily deformed. The larger diameter and thinner wall thickness of the disc bring about the greater amount of deformation. A reduced pressure applied will prevent the disc from deformation. The reduced pressure applied for preventing deformation, however, results in a disadvantage that the joining strength cannot sufficiently be obtained.

Further, both German Patent Application 3205235 (FIG. 2) filed on Feb. 15, 1982 and European Patent Application 54931 (FIG. 7) filed on Dec. 18, 1981 disclose a technology for joining by friction welding through the use of the lap joint process like the technology according to the present invention.

In German Patent Application 3205235 the faces over-lapped between a rim and a disc are inclined as shown in FIG. 2. The rim is rotated, while the disc is stationary. The rim is pressurized axially toward the disc. This method, however, like the butt joint process, has a serious disadvantage that the rim is easily deformed, because the rim is continuously subjected to a large turning force and inertia force unilaterally, while a large braking force is generated in the joining surfaces in the reverse direction. Moreover, flash is produced out of the friction surface while the rim is rotated and a pressurizing process is progressing. The rim is gradually transferred to the right. This would cause the portion of the rim which is subjected to frictional heat to be varied moment by moment, resulting in insufficient joining performed.

Figure 7:
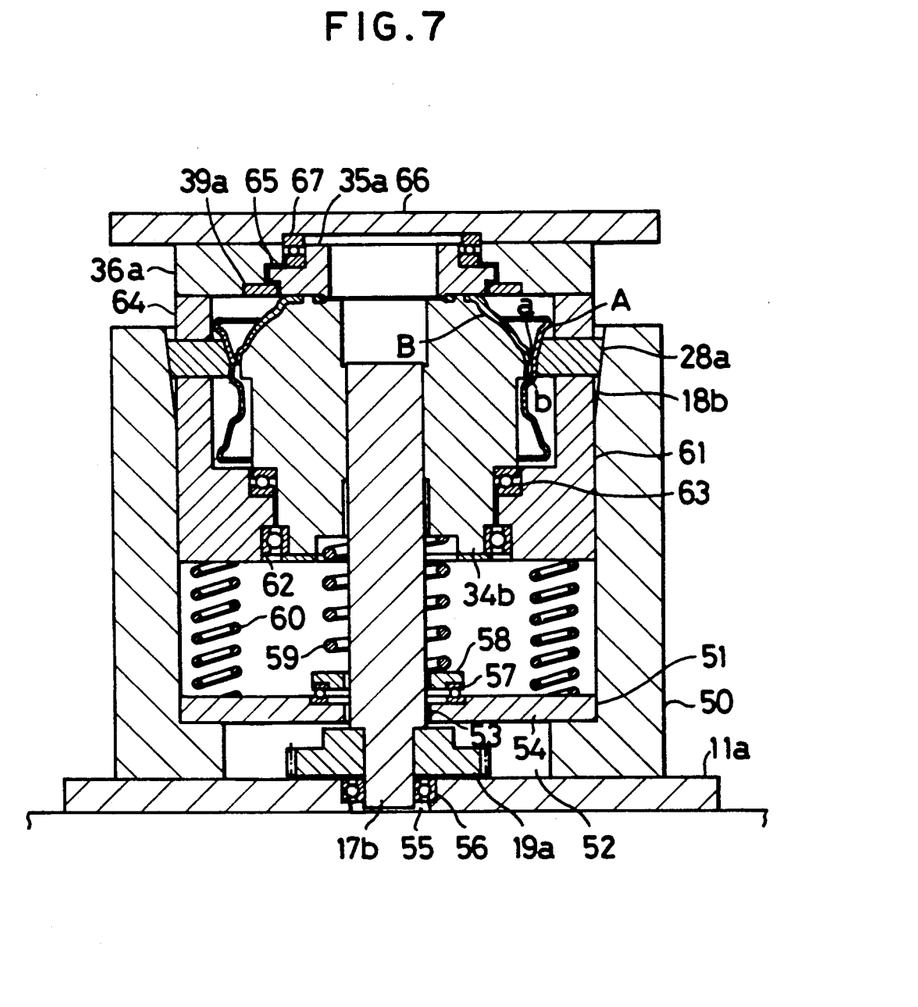

On the other hand, in the European Patent Application, as shown in FIG. 7, the dropped portion of the rim is surely overlapped with the periphery of the disc, But European Patent Application 54931 does not disclose any joining conditions explained above nor the remarkable effect of preventing deformation, although the conditions and the effect are available from the present invention. Further, FIGS. 2 through 6 of the European Patent Application are examples of the butt joint process. No description, however, can be found in the specification thereof concerning the difference between FIGS. 2 through 6 and FIG. 7.

British Patent No. 1,505,832, entitled "Friction Welding Methods and Apparatus" by R. H. Lilly and Page 17 through 29 of the papers by E. D. Nicholas in Welding Journal, July, 1983 issue introduce a technology wherein the friction welding method via lap joint process is employed for joining long pipes which cannot be rotated at the time of welding and also for omitting a subsequent hole working process required for welded pipes, different from the joining of the disc wheel as stated above. Both of the British Patent and the Welding Journal papers do not refer to the joining of the rim and the disc which are to be assembled into the disc wheel to be mounted on the vehicle. They do not either describe the remarkable feature realized according to the present invention that the produced disc wheel is free from deformation. For reference, the differences between the prior art and the applicant will be described to clarify the technical features and the novelty brought by the remarkable effect of preventing deformation.

The two prior art publications above refer to a) the case wherein an inner face of a ring is joined to a bar-shaped body, b) an inner or outer face of a ring is joined to a cylindrical body, and c) an inner or outer face of a ring is joined to pipes at the time of joining the pipes. These three cases have a feature in common, that is, the rotated ring allows the joining faces to be pressurized via means for compressing or expanding the entire ring. As a result, the entire outer or inner face of the ring can be joined. On the other hand, according to the present invention, a projection is provided on the circumferential portion of the rim and/or the disc to join the overlapped portion only. At the time of joining, the applied pressure is concentrated on the projection by means for compressing or expanding the portion adjoining to the joint only. The other portions are comparatively free from the influence of the applied pressure. This prevents the disc wheel from distortion. The deformation or distortion in question particular to the disc wheel is brought about by the joining method adopted at the time of friction welding, as stated above. The method for preventing the deformation or distortion cannot easily be anticipated from the above prior art publications. Furthermore, the projection provided on the joint allows the flash occurring at the joint to be removed quite easily, resulting in bringing a favorable effect on the joined workpiece.

Next, according to Table 3 on page 24 of Welding Journal stated above, the maximum size of the joined pipes is 108 mm in outer diameter and 88.5 mm in inner diameter. The ring used for joining the pipes is 138 mm in outer diameter, 91.5 mm in inner diameter and 19 mm in width. The ring is very light in weight. This lightweight ring is subjected to rotation at the time of joining. When the ring is brought to a complete stop at the end of the joining operation, there is substantially no remaining inertia force expected to act continuously at the time of the halt. The inertia force continued to work at the time of the suspension is a cause of deformation or distortion. In contrast, the rim and the disc to be assembled into the disc wheel according to the present invention is very large in size and in weight in comparison with the ring stated above. In addition, either the rim or the disc has to be subjected to rotation. A large inertia force is continued to act on the disc compared to the light-weight ring stated above. To make matters worse, the thin wall thickness of the disc wheel in the light of the diameter thereof causes the magnitude of the deformation or distortion to be great. Accordingly, although several friction welding methods have been proposed as stated above, no methods have been actually carried out because no methods have succeeded in preventing the deformation or distortion peculiar to the disc wheel.

It should be noted that prior to completion of this invention many studies and researches have been made on the joining of the rim and the disc to produce the disc wheel. Among the results, an explanation will be made concerning the case wherein neither the rim nor the disc is provided with the projection at the time of the production of the disc wheel using the apparatus shown in FIG. 1 to emphasize the feature of the present invention. The explanation will make the person skilled in the art understand that the present invention cannot be readily anticipated from the publications stated above. The results of the repeated experiments showed that the disc had a tendency of deforming into an ellipse at the joint with the result that the entire circumference could not be joined completely. The circumferential portion of the disc which had the major axis of the ellipse was joined well, while the circumferential portion of the disc with the minor axis of the ellipse was poorly joined. The deformation or distortion caused the face of the disc, on which the disc wheel was mounted on the vehicle, to be warped too. Therefore it is apparent that any friction welding method for joining a rim and a disc through the lap joint process and any apparatus therefor, which are only proposed, are not sufficient for preventing deformation in question peculiar to a disc wheel.

SUMMARY OF THE INVENTION

The present inventor paid attention to the lap joint process instead of the butt joint process. According to the inventor's idea, a portion where an outside material and an inside material were lapped or superimposed on each other was to be provided. Then a pressure was to be applied to the lapped or superimposed portion in the outward direction from the inside or in the inward direction from the outside so that the amount of deformation can be reduced. His repeated researches and experiments led to the realization of the present invention.

The object of the present invention is to provide a friction welding method for joining a rim and a disc of a disc wheel and the apparatus therefor whereby the amount of deformation can be reduced at the time of friction welding of a rim and a disc to produce a disc wheel to be mounted on a vehicle.

The friction welding method for joining a rim and a disc of a disc wheel and the apparatus therefor according to the present invention are provided to realize the above object. The method and apparatus will be described in detail as follows:

The technology according to the present invention is especially suited for joining a rim and a disc to manufacture a disc wheel to be mounted on a vehicle.

The rim of the disc wheel is called an outside material and the disc of the disc wheel is called an inside material. Both of the materials are manufactured beforehand as follows: At first the two materials are made so that the inside material is to be fitted into the outside material. A projection which is protruded from the circumference is provided almost entirely circumferentially so that the projection is opposed to each other or to another material, when the two materials are fitted. The projection is provided either on the inside circumference of the outside material or on the outside circumference of the inside material, or on both of the materials. When the projection is provided on either the inside material or the outside material, it is rather preferable to provide the projection on the outside material. It is also preferable to provide the projection on both the inside material and the outside material. The shape of the projection is preferably of square type in section. The shape can also be triangular, semicircular or trapezoidal in section.

In the friction welding method for joining a rim and a disc of a disc wheel according to the present invention, at first the outside material and the inside material are put into the state of fitting the inside material into the outside material. The outside or inside circumference of either of the materials is firmly fixed almost entirely circumferentially. Then, while either of the materials is subjected to rotation, one material is pressed uniformly via the projection almost entirely circumferentially toward another fixed material as stated above in the inward or outward direction so that frictional heat can generate at the contacted faces to join both of the materials.

In case, larger materials, for instance, a rim and a disc for a vehicle are joined together, it is preferable that the outside circumference of the outside material is firmly fixed almost entirely circumferentially, so that a pressure is applied uniformly via the projection almost entirely circumferentially from the inside of the inside material to the outside material, while the inside material is rotated.

The friction welding apparatus for joining a rim and a disc of a disc wheel according to the present invention is for performing the friction welding method as stated above. The apparatus comprises as follows: Means for fixing firmly the outside or inside circumference of either of the materials almost entirely circumferentially, the inside material being in the state of fitting into the outside material; means for rotating either of the materials; and means for generating frictional heat at a joining face between both of the materials by pressurizing uniformly via the projection almost entirely circumferentially to the fixed material as stated above in either the outer or inner direction.

The means for rotating either of the materials may be the means adopted in each of the preferred embodiments. Other means may be acceptable. The means for generating frictional heat at a joining face between both of the materials by pressurizing uniformly via the projection almost entirely circumferentially to the fixed material as stated above in either the outer or inner direction is preferably the means adopted in the preferred embodiments. The means adopted in the preferred embodiments comprises, typically, ring-shaped pressurizing pieces which are disposed around the outside circumference of the outside material or around the inside circumference of the inside material almost entirely circumferentially for the purpose of expanding or compressing the pressurizing pieces for pressurization. The other means are also available. The pressurizing pieces may be of one-piece type forming a ring with one portion cut off, or of two- or three-piece type which can be integrated to form a ring. A tapered face can be utilized to expand or compress the pressurizing pieces as shown in the preferred embodiments. Liquid pressure or air pressure as well as a cam mechanism or a link mechanism can also be employed other than the above.

Likewise, in case a rim and a disk are to be joined, the outside material is preferably to be fixed and the inside material is to be rotated. Then the outside material is to be subjected to a pressure from the inside of the inside material.

In case the outside material is fixed, a fixing jig which has the contour of the inner circumference substantially corresponding with the contour of the outer circumference of the outside material is to be used, as in, for instance, Preferred Embodiment 1. The outside material is preferably disposed within the fixing jig in close contact therewith, so that the outside circumference of the outside material can be firmly fixed with the fixing jig almost entirely circumferentially. In case the inside material is rotated, a rotation axis is to be disposed in the center of the inside material as well as the outside material. Further, means for power transmission is provided between the inside material and the rotation axis to transmit the rotational movement of the rotation axis to the inside material, as, for instance, in Preferred Embodiment 1. The means for power transmission may be the ones adopted in each of the preferred embodiments. Other means can also be adopted. Any means can be utilized as means for power transmission as long as a rotational movement of the rotation axis can be transmitted to the inside material so that both the means for power transmission and the rotation axis can be rotated together.

In case the inside material is pressurized in the outside direction toward the outside material, ring-shaped pressurizing pieces are preferably disposed around the inside circumference of the inside material almost entirely circumferentially. Means for expanding the pressurizing pieces helps expand the inside material for pressurization. As for means for expanding the pressurizing pieces, a rotation axis provided with a tapered portion can be disposed in the center of the pressurizing pieces in a state of placing the tapered portion in the middle of the pressurizing pieces, as in, for instance, Preferred Embodiment 1. The rotation axis is moved axially so that the tapered portion causes to expand the pressurizing pieces. Otherwise, the movement of the pressurizing pieces, the outside and inside materials except the rotation axis enables the tapered portion to expand the pressurizing pieces. The tapered portion can be formed by providing the rotation axis with a pyramidal or conical portion. The tapered portion can also be formed by mounting on the outer circumference of the rotation axis a different material which is pyramidal or conical in its outer circumferential shape.

The entire apparatus can be of vertical type, as in each of the preferred embodiments. It also can be of horizontal type.

A detailed explanation will be made on the structure of the apparatus as follows: As in, for instance, Preferred Embodiment 1, the outside material is fixed and the annular pressurizing pieces are disposed around the inner circumference of the inside material. The tapered portion of the rotation axis is positioned in the center of the pressurizing pieces. The rotation axis and other parts can be relatively moved axially. The above case is the best preferred embodiment.

The gradient of the tapered portion of the rotation axis is $1/n$. The relative effective length of travel of the rotation axis is "L". The effective upset length of the pressurizing pieces in the radial direction is "l", and the relative pressure applied axially is "p". The pressure applied to the outer circumferential direction from the tapered portion of the rotation axis is "P". Then there is a relationship therebetween, and the relationship can be expressed by the following equation: (It should be noted that "the relative effective length of travel 'L' of the rotation axis" is the length or distance corresponding to the period of time when the pressure is being actually applied on the contact faces out of the relative length of travel between the rotation axis and the other components. "The effective upset length 'l' of the pressurizing pieces in the outer circumferential direction" is the upset length along which the upset pressure is being actually applied on the contact faces out of the upset length of the pressurizing pieces in the outer circumferential direction. "The relative pressure 'p' applied axially" is the pressure applied to the rotation axis or the other components.)

| $P = np$ | $1/n = 1/L$ |
| --- | --- |

That is to say, the pressure 'P' applied in the direction of the outer circumference from the tapered portion of the rotation axis is magnified "n" times the relative pressure "p" applied axially, i.e., the smaller the gradient $1/n$ of the tapered portion is, the greater the power for expanding the pressurizing pieces in the outer circumferential direction is. Further, the gradient $1/n$ of the tapered portion is determined depending upon the ratio of the effective upset length "l" of the pressurizing pieces in the outer circumferential direction to the relative effective length of travel "L" of the rotation axis. The smaller the ratio is, the smaller the friction force at the contact face is. The resulting heat generated is also insufficient. Further, the relative effective length of travel "L" of the rotation axis also becomes large.

The lowest value of 1/n is known as 1/500 from our many experimental results. The optimum value is determined in equilibrium of, say, the relative effective length of travel "L" of the rotation axis, the turning force of the rotation axis and the time of the frictional heat generating process. The highest value is not especially restricted. But the value of one or less is preferable. The gradient of the tapered portion should preferably be gradually larger axially. The gradient should also be still larger at the portion corresponding to the final upset pressure applying process.

As stated above, the relative effective length of travel "L" of the rotation axis is determined, for instance, in equilibrium of the gradient 1/n, the turning force and the time required for the frictional heat generating process. The values of "L" preferably range between 50 and 1,000 mm.

In case the tapered portion of the rotation axis is a polygonal pyramid in shape, the number of the pressurizing pieces preferably corresponds with the number of the faces of the polygonal pyramid. The increase in number of the pressurizing pieces desirably allows the smaller gaps between the pressurizing pieces. It is ascertained that if the summation of the gaps between the pressurizing pieces amounts to 5% or less of the total length of the joint, the amount is enough for joining. If the number of the faces of the pyramid in the tapered portion is three and more, there is no problem. The faces may be many in number.

In the friction welding method for joining a rim and a disc of a disc wheel and the apparatus therefor according to the present invention, it is preferable that the circumferential speed of the contact faces at the time of the frictional heat generating process should be 30 m/min or more. The speed less than the above fails to obtain a sufficient heating value. The time required for the frictional heat generating process is preferably 10 seconds or less.

In the friction welding method for joining a rim and a disc of a disc wheel and the apparatus therefor according to the present invention, at first the outside and inside materials are put into the state of fitting one into the other. Then the outer or inner circumference of either outside or inside material is firmly fixed almost entirely circumferentially by a suitable fixing means. While either material is subjected to rotation, one material is pressurized uniformly via the projection to another fixed material stated above in the inner or outer direction almost entirely circumferentially, so that frictional heat generates at the projection to join both of the materials through friction welding.

BRIEF DESCRIPTION OF THE DRAWINGS

FIGS. 9a–j are essential sectional views showing several kinds of shapes of the projection which a rim and/or a disc are provided with.

DESCRIPTION OF THE PREFERRED EMBODIMENTS

The preferred embodiments according to the present invention will be described in reference with the accompanying drawings.

Preferred Embodiment 1

Figure 1:
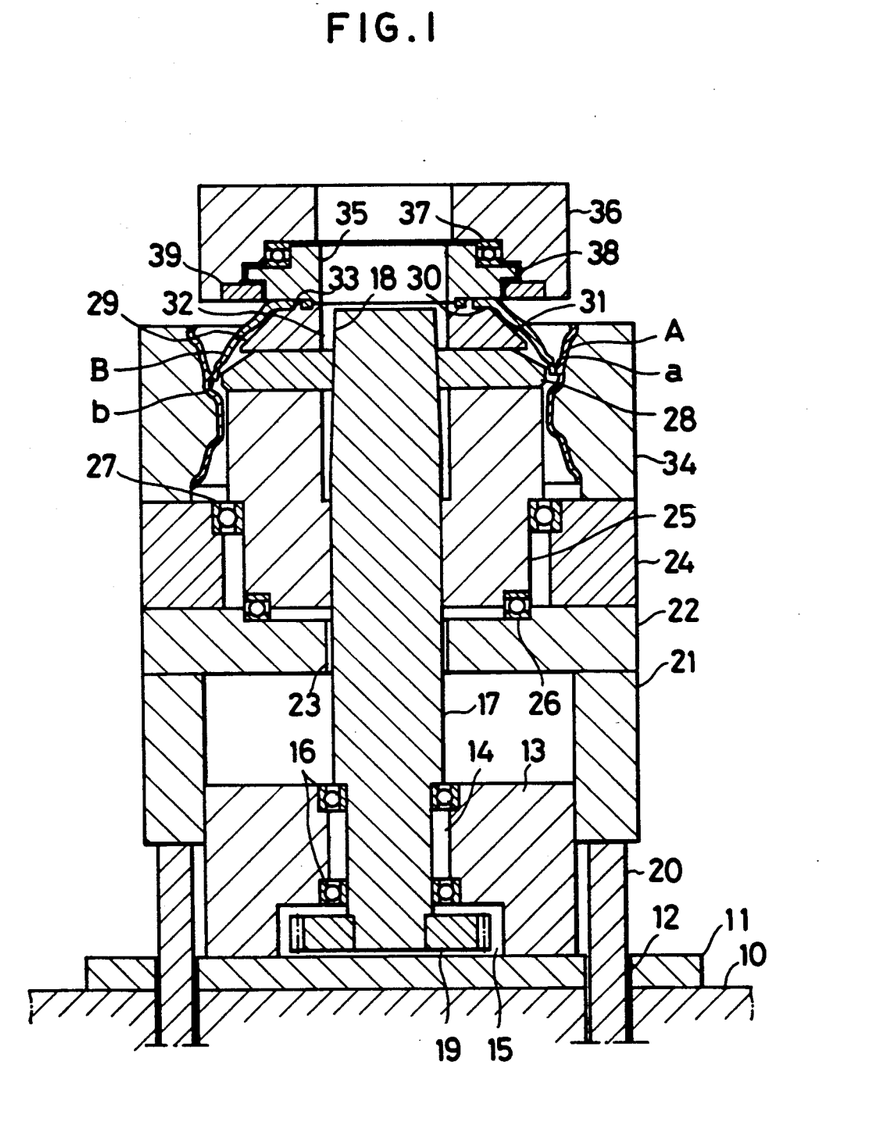
FIG. 1 is a longitudinal sectional view showing Preferred Embodiment 1 according to the present invention.

FIG. 1 is a longitudinal sectional view showing Preferred Embodiment 1.

In FIG. 1, reference numeral 10 shows a foundation. The foundation 10 fixes thereon a stand 11. A plurality of vertical holes 12 are bored through the stand 11 and the foundation 10. A fixed stand 13 is fixed on the stand 11 inside the plurality of the holes 12. A circular hole 14 is bored vertically through the center of the fixed stand 13. The lower portion of the hole 14 is an enlarged hole 15.

A pair of bearings 16 are provided in the top and bottom outer periphery of the hole 14 bored through the fixed stand 13, respectively. A rotation axis 17 penetrating through the bore 14 and directing upward vertically is disposed via the bearings 16. The upper portion of the rotation axis 17 is provided with a tapered portion 18 which has a shape of a pyramid. The lowest portion of the rotation axis 17 is provided with a gear 19. The gear 19 is received horizontally in the enlarged hole 15 bored through the fixed stand 13.

A plurality of legs 20 are each inserted from above into the holes 12 bored through the stand 11. The lower portion of each leg 20 is provided with a hydraulic mechanism, not shown, to support the leg 20 so that the leg 20 can be moved upward and downward. A cylindrical body 21 is mounted on the upper portion of each leg 20. The cylindrical body 21 has the fixed stand 13 fitted thereinto. A supporting plate 22 is mounted on the cylindrical body 21. A hole 23 is drilled vertically through the center of the supporting plate 22 so that the rotation axis 17 can penetrate through the hole 23. A supporting cylinder 24 is mounted on the outer periphery of the supporting plate 22. A rotating cylinder 25 is disposed between the rotation axis 17 and the supporting cylinder 24. The lower half portion of the inner periphery of the rotating cylinder 25 is in close contact with the outer periphery of the rotation axis 17. A bearing 26 is disposed between the rotating cylinder 25 and the supporting plate 22. A bearing 27 is also disposed between the rotating cylinder 25 and the supporting cylinder 24.

A plurality of pressurizing pieces 28 are mounted on the rotating cylinder 25. The pressurizing pieces correspond in number with the faces of the pyramid of the tapered portion 18 formed on the rotation axis 17. The pressurizing pieces are disposed around the outer periphery of the tapered portion 18 to form a ring. The inside face of each pressurizing piece is formed so that the inside face can closely contact each face of the pyramid formed on the tapered portion 18. The outer periphery of assembled pressurizing pieces is shaped into a circle and has a slightly larger diameter than the rotating cylinder 25. A fixing member 29 is mounted on the pressurizing pieces 28. The pressurizing pieces 28 can move up and down along the tapered portion 18 of the rotation axis 17 so that the pressurizing pieces can expand or contract between the fixing member 29 and the rotating cylinder 25. The fixing member 29 is formed into a circle as a whole. The fixing member 29 has an upper face 30 which has a shape of a circular plane. The fixing member 29 has an outer circumferential face 31 shaped into a cone. A hole 32 is bored through the center of the fixing member 29. The substantially upper portion of the rotation axis 17 is inserted into the hole 32. The upper face 30 of the fixing member 29 is provided with a plurality of projections 33 standing upward therefrom, the projections being fitted into bolt holes bored through a disc (B) to be explained later.

A cylindrical fixing jig 34 is mounted on the supporting cylinder 24. The fixing jig 34 is divided into two and can be assembled by bolts to be expanded or contracted on the supporting cylinder 24. The inner circumferential surface of the fixing jig 34 is so shaped as to correspond with the outer circumferential surface of a rim (A).

A pressing piece 35 is disposed on the fixing member 29, the pressing piece shaping like a ring. A pressurizing member 36 is provided thereunder with a recess, into which the pressing piece 35 is fitted. The pressurizing member 36 is disposed on the pressing member 35. The pressurizing member 36 is supported by suitable means so as to be prevented from rotation, although not shown. The pressurizing member 36 can move up and down. A bearing 37 is disposed between the pressurizing member 36 and the pressing piece 35,.the bearing 37 allowing the pressing piece 35 to rotate relative to the pressurizing member 36. The pressing piece 35 is provided with a collar 38 on the outer periphery thereof. The pressurizing member 36 is provided with a retaining ring 39 disposed under the collar 38 to retain the pressing piece 35.

The apparatus as shown above is operated as follows: The rim (A) formed with a circumferential projection (a) around the entire inner circumference thereof and the disc (B) formed with a circumferential projection (b) around the entire outer circumference thereof are manufactured beforehand, both projections directing radially. The pressurizing member 36 is lifted upward together with the pressing piece 35. Then the two-piece fixing jig 34 is expanded. The rim (A) is fitted into the inner circumference of the fixing jig 34. The two-piece fixing jig 34 is compressed to be assembled with bolts. Next, the fixing member 29 is covered with the disc (B). The projections 33 on the fixing member 29 are fitted into the bolt holes bored in the disc (B). In this way, the projection (a) formed horizontally around the entire inner circumference of rim (A) comes into close contact with the projection (b) formed around the entire outer circumference of the disc (B), both of the projections opposing each other around the entire circumference. As a final process, the pressing piece 35 is lowered together with the pressurizing member 36 to let the pressing piece 35 press on the upper surface of disc (B), as shown in FIG. 1.

Figure 3:
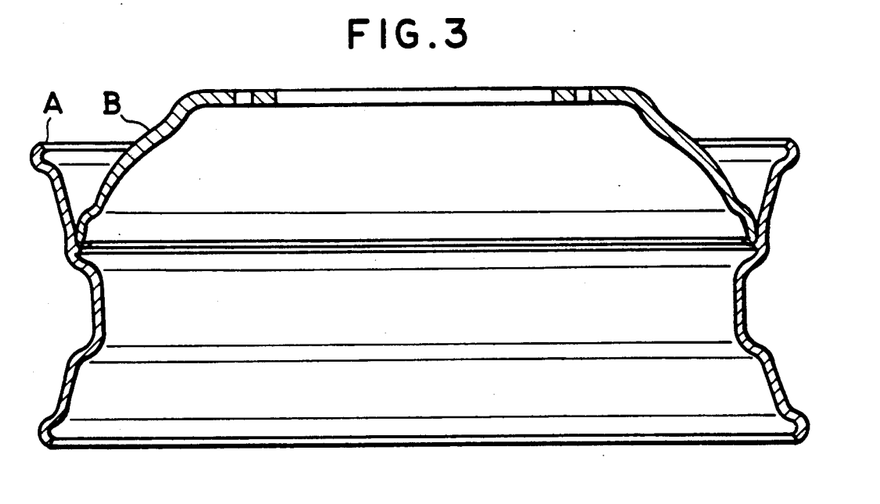
FIG. 3 is a longitudinal sectional view showing a disc wheel manufactured by an apparatus in Preferred Embodiment 1.

The gear 19 is rotated via a suitable gear drive mechanism by a motor not shown to rotate the rotation axis 17 so that the pressurizing pieces 28 also rotate together. The pressing piece 35 which presses on the disc (B) permits the pressing piece 35, the disc (B), the fixing member 29 and the rotating cylinder 25 also to rotate together. At this time the lowered pressurizing member 36 causes the pressing piece 35, the disc (B), the fixing member 29, the pressurizing pieces 28, the rotating cylinder 25, the fixing jig 34, the rim (A), the supporting cylinder 24, the supporting plate 22 and the cylindrical body 21 also to be lowered together. When the above components are in the process of being lowered, the pressurizing pieces 28 are expanded by virtue of the tapered portion 18 of the rotation axis 17. The pressurizing pieces 28 cause to pressurize the projection (b) of the disc (B) toward the projection (a) of the rim (A) so as to generate a friction force between the both. The friction force continued to generate results in heating of the friction surfaces. When a predetermined temperature suited for pressure welding is reached, the rotation axis 17 is brought to a stop. Then the pressurizing member 36 is further lowered to apply an upset pressure. The above process carried out as above will complete friction welding between the rim (A) and the disc (B). A product taken out after joining is shown in FIG. 3.

The turning force of the rotation axis 17 is at first transmitted to the disc (B) via fixing member 29. At the time of friction welding process the turning force is also transmitted via pressurizing pieces 28. Namely, the turning force can be transmitted uniformly to the entire disc (B) at the time of the friction welding process. Consequently, the disc is not easily deformed. In this regard, in the conventional methods, at the time of power transmission the turning force is concentrated on the face of the disc on which face the disc wheel is mounted on a vehicle, which results in the deformation of the disc.

COMPARISON TESTS

The results of the tests on the disc wheels for comparison of the deformation after joining will be shown. The test was carried out on the disc wheel shown in FIG. 3 and the disc wheel manufactured according to the conventional butt welding method is shown in FIG. 2.

The tested disc wheels were for vehicles and had a nominal dimension of 22.5×7.50 prescribed in the Japanese Industrial Standards—D4218. Three kinds of the materials chosen were a steel SAPH 41 and aluminum alloys 5454 and 2024. Only as for aluminum alloy 2024, the rims and the discs were heated and maintained at 493 degrees centigrade for an hour and then quenched in water before joining. Subsequently the alloys were subjected to artificial aging wherein the alloys were maintained at 190 degrees centigrade for 12 hours. The rims were formed by rollers. The wall thickness after forming was 6.5 mm. The discs were produced as follows: At first, aluminum plates were pressed to have a wall thickness of 12 mm. Then the plates were worked by coining so that the plates were increasingly thinned toward the circumference to have a wall thickness of 6.5 mm at the circumference.

The disc wheel shown in FIG. 3 was formed so that both the rim (A) and disc (B) had a projection of 3 mm in height and 6.5 mm in width.

The joining conditions of the disc wheel shown in FIG. 3 were as follows: The pyramidal portion of the tapered portion 18 on the rotation axis 17 had a gradient of 1/30 for the frictional heat generating process and a gradient of ⅓ for the upset pressure applying process. The relative speed of the joined faces was 200 m/min at the frictional heat generating process. The relative effective length of travel of the rotation axis 17 was 140 mm. The frictional heat generating time was 5 sec. The effective upset length of the pressurizing pieces 28 toward the periphery was 6 mm. At the time of the upset pressure applying process, the relative effective length of travel of the rotation axis 17 was 10 mm. The maximum axial pressure applied was 60 tons.

The joining conditions of the disc wheel shown in FIG. 2 were as follows: The relative speed of the joined faces was 200 m/min at the time of the frictional heat generating process. The pressure applied was 60 tons. The time of the frictional heat generating process was 10 sec. The upset length was 5 mm. The pressure applied at the time of the upset pressure applying process was 170 tons.

Figure 4:
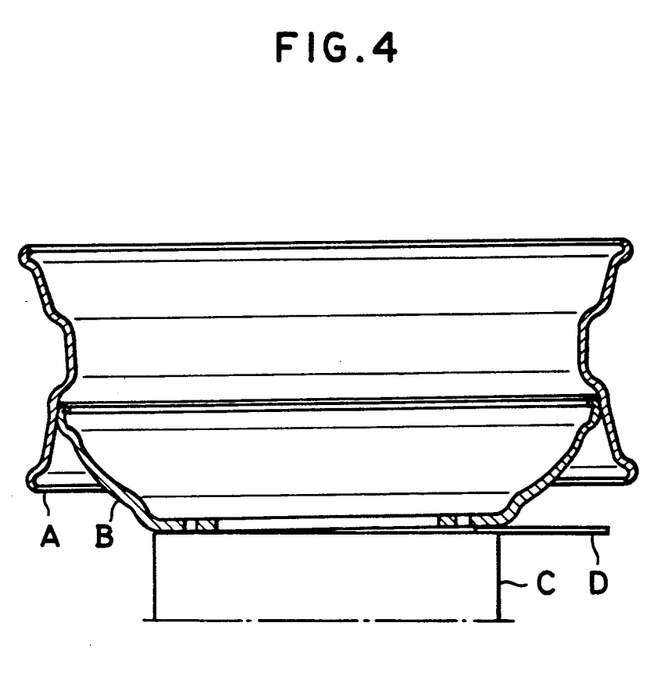
FIG. 4 is a longitudinal sectional view showing an apparatus for inspecting the deformed amount of a disc wheel.

The disc wheels shown in FIGS. 2 and 3 were subjected to a test for deformation, respectively, by the method as shown in FIG. 4. This test method was based on C614-87 in JASO (Japanese Automobile Standards Organization prescribed by Society of Automobile Engineers of Japan, Inc.). The disc (B) was placed on a measuring surface plate (C) having a flat surface on the front side. A clearance gage (D) was inserted into a gap between the measuring surface plate (C) and the outer circumference of the face of the disc, the face of which was to be mounted on the vehicle, for testing of deformation. Four disc wheels were made from each material for testing, the results of which are shown in Table 1. The unit was in millimeter.

TABLE 1

| Material | Clearances between disc and gage Wheels shown in FIG. 3 | Clearances between disc and gage Wheels shown in FIG. 2 |
|---|---|---|
| SAPH | 0.07 | 3.3 |
| | 0.08 | 3.5 |
| | 0.08 | 3.6 |
| | 0.09 | 3.7 |
| 5454 | 0.07 | 4.5 |
| | 0.07 | 4.7 |
| | 0.08 | 4.9 |
| | 0.09 | 4.9 |
| 2024 | 0.06 | 3.7 |
| | 0.07 | 3.8 |
| | 0.07 | 4.1 |
| | 0.08 | 4.3 |

JOINT STRENGTH TESTS

Figure 5:
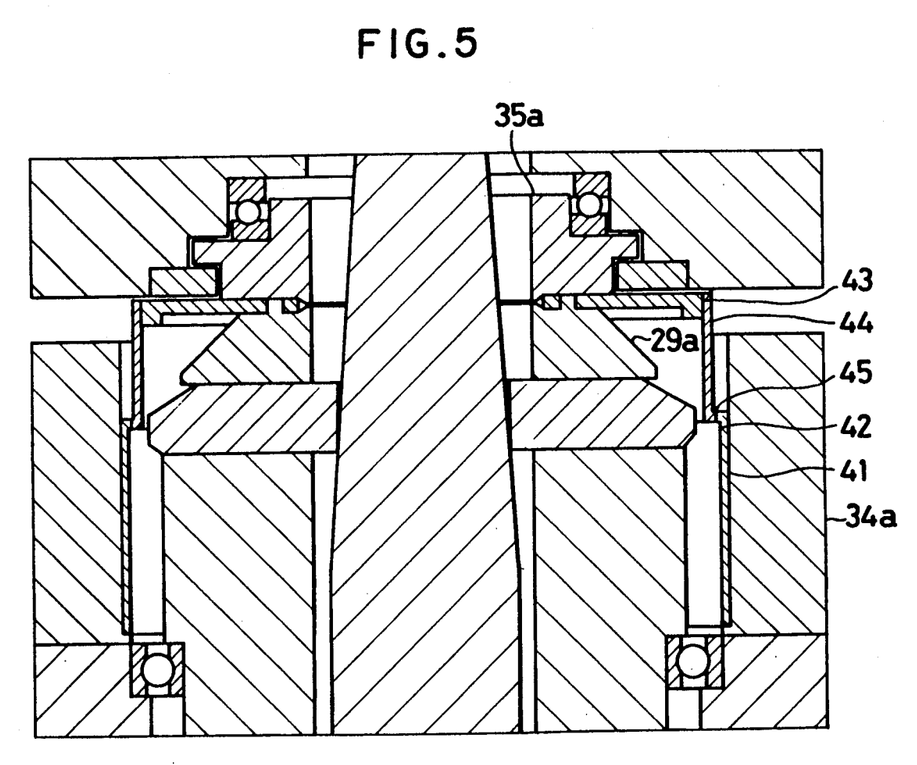
FIG. 5 is a longitudinal sectional view showing an apparatus for manufacturing specimens to be tested.

The joint strength was tested on the disc wheels in FIG. 3. At first, specimens were manufactured by the apparatus shown in FIG. 5. The apparatus used was the same as the apparatus shown in FIG. 1 except the fixing jig 34a which had the inner circumferential surfaces formed into a cylindrical shape. In FIG. 5, reference numeral 41 was an outer ring. The outer ring 41 was cylindrical in shape. The outer diameter thereof corresponded with the diameter of the inner circumferential surface of the fixing jig 34a. The outer ring 41 was put into close contact with the inner circumferential surface of the fixing jig 34a. The outer ring 41 had a projection 42 formed around the upper inner circumference thereof. A mounting plate 43 which was a disc in shape was mounted so as to be put between a pressing piece 35a and a fixing member 29a. An inner ring 44 was mounted on the outer circumference of the mounting plate 43, the inner ring 44 being directed downward. The inner ring 44 was cylindrical in shape and had a diameter slightly smaller than the diameter of the outer ring 41. The inner ring 44 had a projection 45 formed on the lowest outer circumference thereof. The foremost end of the projection 45 was brought to close contact with the foremost end of the projection 42 of the outer ring 41.

The wall thickness of the outer ring 41 and the inner ring 44 was 6.5 mm, respectively. The width and the height of the projections 42 and 45 were the same as the projections stated above. The joining conditions were also the same as the conditions stated above. The outer rings 41 and the inner rings 44 were made of three kinds of materials which were SAPH for steel, and 5454 and 2024 for aluminum alloys. Each specimen was made from the above materials.

The joints of these specimens were subjected to a radiograph examination stipulated in Japanese Industrial Standards Z 3104 and Z 3108. All of the results were of first grade and free of defects.

Further, two tensile test pieces were taken from each of the joints for tensile test, the test pieces being 6.5 mm in wall thickness, 10 mm in width and 100 mm in length. All of the results of the tensile test proved to be fractured at base metals. Consequently, the joints were sound.

Preferred Embodiment 2

Figure 6:
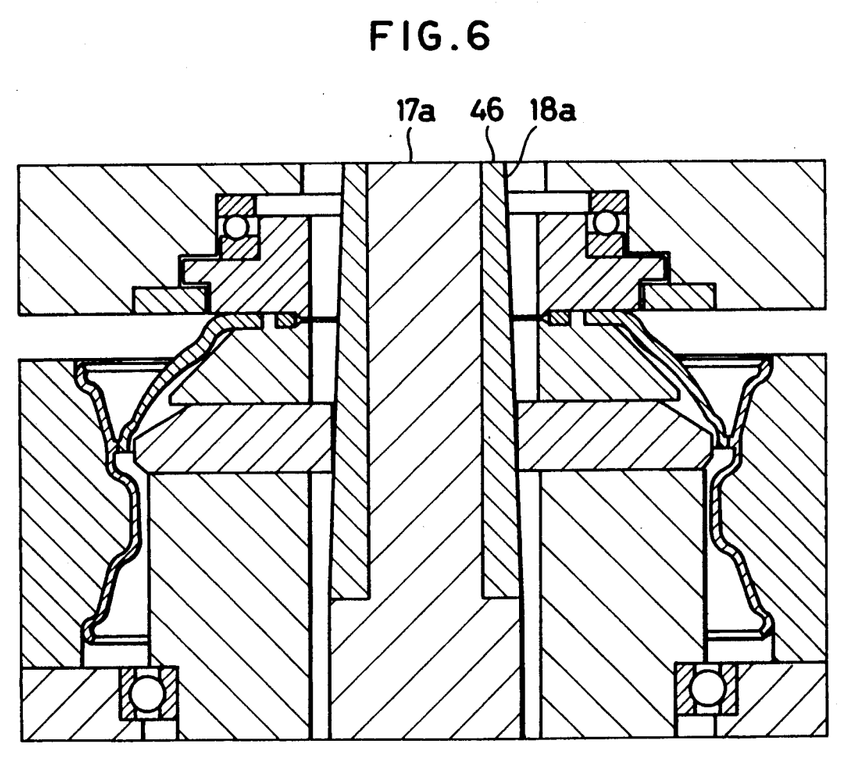
FIGS. 6, 7 and 8 are longitudinal sectional views showing Preferred Embodiments 2, 3 and 4, respectively.

FIG. 6 is a longitudinal sectional view showing the essential parts of Preferred Embodiment 2. A rotation axis 17a is not provided with the tapered portion 18. The rotation axis 17a is mounted with a tapered member 46 on the outer circumference thereof. The apparatus is the same as the apparatus of Preferred Embodiment 1 except that the outer circumference of the tapered member 46 is a tapered portion 18a. An explanation is done away with, because the operation of the apparatus is the same as the operation of Preferred Embodiment 1.

Preferred Embodiment 3

FIG. 7 is a longitudinal sectional view showing Preferred Embodiment 3. Preferred Embodiment 3 is the case wherein the pressurization is made from the outside, although Preferred Embodiment 1 is the case wherein the pressurization is made from the inside.

A large cylindrical body 50 is mounted in the vicinity of the outer periphery of a stand 11a in a manner of pointing vertically upward. The cylindrical body 50 is provided with a tapered portion 18b around the inner circumferential surface of the upper portion thereof The cylindrical body 50 has a reducing inside diameter at the tapered portion viewed from the top downwardly. The cylindrical portion 50 is provided with a stepped portion 51 in the vicinity of the lowermost inside portion thereof The inside end of the stepped portion 51 forms a hole 52. The stepped portion 51 has a disc-shaped supporting plate 54 mounted thereon. The supporting plate 54 has a circular hole 53 bored in the center thereof. A rotation axis 17b is disposed through the central hole 53 directing vertically upward. The lowermost end portion of the rotation axis 17b is inserted into a hole 55 bored in the center of the stand 11a. A bearing 56 is provided in the hole 55 between the rotation axis 17b and the stand 11a. Between the supporting plate 54 and the stand 11a, a gear 19a is received. The gear 19a is mounted on the rotation axis 17 at the lowermost end thereof.

A fixing jig 34b is disposed around the upper outer circumference of the rotation axis 17b. The fixing jig 34b rotates together with the rotation axis 17b. The fixing jig 34b can be moved up and down relative to the rotation axis 17b. The upper part of the fixing jig 34b is formed in a shape substantially corresponding with the contour of the inside surface of the disc (B). The disc (B) covers the fixing jig 34b to mount thereon. A rotary ring 58 is disposed via a bearing 57 around the outer circumference of the rotation axis 17b and also on the supporting plate 54. A coiled spring 59 is disposed around the outer circumference of the rotation axis 17b and between the fixing jig 34b and the rotary ring 58. Also in the vicinity of the outer periphery of the supporting plate 54 and at a plurality of places on the periphery, coiled springs 60 are disposed directing vertically upward. A supporting cylinder 61 is disposed on these coiled springs 60. The supporting cylinder 61 is disposed, at the outer circumference thereof, in contact with the inner circumferential surface of the cylindrical body 50. Via one pair of bearings 62 and 63, the fixing jig 34b is supported by the supporting cylinder 61 at the inner periphery of the lower half portion thereof. A plurality of pressurizing pieces 28a are disposed on the supporting cylinder 61. The outer circumferential surfaces of the pressurizing pieces 28a are provided with a slope corresponding with the slope of the tapered portion 18b of the cylindrical body 50 so that the pressurizing pieces 28a can be moved up and down along the tapered portion 18b. The inner circumferential surfaces of the pressurizing pieces 28a are formed into a shape corresponding with the outer circumferential surface of the portion of the rim (A) having the projection (a) in the vicinity thereof. The rim (A) is disposed in the state of having the outer circumferential surface thereof closely contacting with the inner circumferential surfaces of the pressurizing pieces 28a. At this time the projection (a) of the rim (A) and the projection (b) of the disc (B) are brought into contact with and opposing each other. A ring 64 is disposed on the pressurizing pieces 28a.

An annular pressurizing member 36a is disposed on the ring 64. The pressurizing member 36a has a hole 65 bored in the center thereof. The hole 65 receives the pressing piece 35a therein. The pressing piece 35a is retained by a retaining ring 39a. A pressurizing plate 66 is mounted on the pressurizing member 36a. A bearing 67 is disposed between the pressurizing plate 66 and the pressing piece 35a.

The apparatus shown in FIG. 7 is operated as follows: The rotation of the rotation axis 17b through the gear 19a by a gear drive mechanism causes the fixing jig 34b to be rotated together with the coiled spring 59 and the rotary ring 58. Further, the rotating fixing jig 34b allows the disc (B) to be rotated. When these components are accelerated to a sufficient rotational speed, the pressurizing plate 66 is lowered. The pressurizing plate 66 causes, for instance, the ring 64, the pressurizing pieces 28a, the rim (A), the supporting cylinder 61, the disc (B) and the fixing jig 34b to be lowered via the pressurizing member 36a and the pressing piece 35a. The pressurizing pieces 28a are compressed by the tapered portion 18b of the cylindrical body 50 to pressurize the rim (A) from the outside thereof, as the pressurizing pieces 28a are lowered. The description of the subsequent operations will not be made as it is known from the description of Preferred Embodiment 1.

Preferred Embodiment 4

Figure 8:
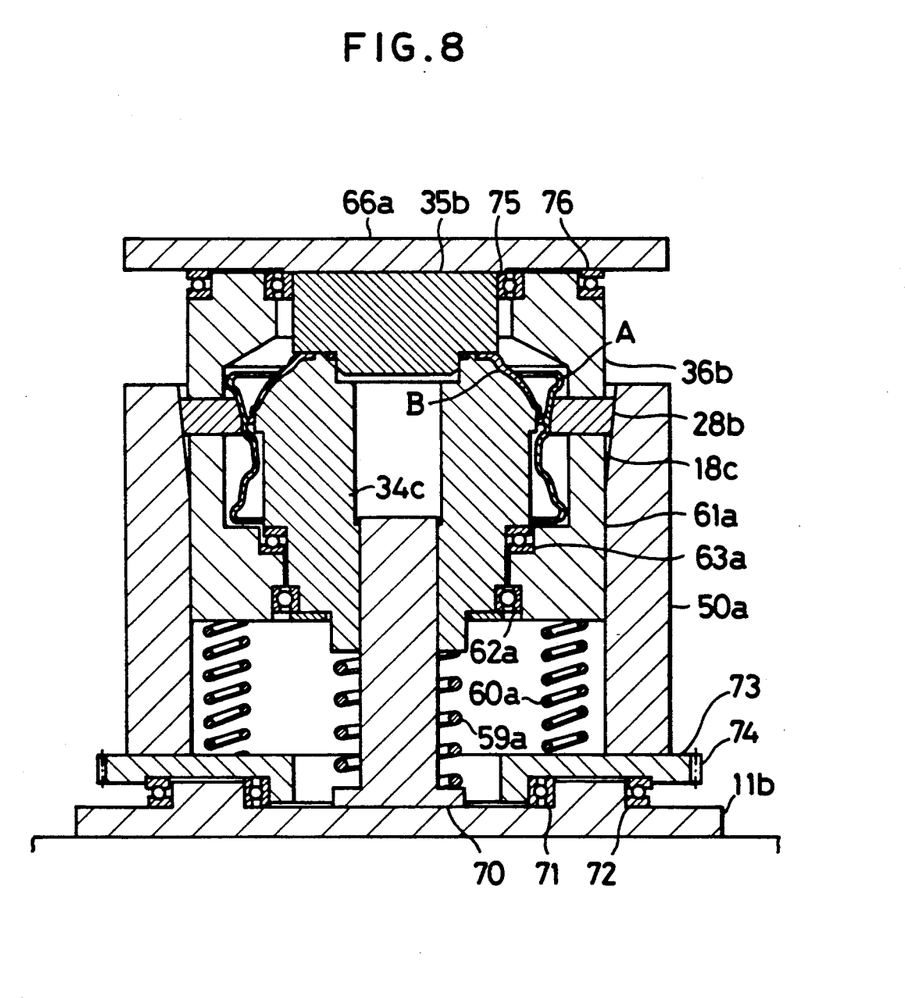

FIG. 8 is a longitudinal sectional view showing Preferred Embodiment 4. In Preferred Embodiment 4 the rim (A) is rotated, although the disc (B) is rotated in Preferred Embodiment 3.

A central axis 70 is fixed on a stand 11b at the center thereof directing vertically upward A fixing jig 34c is mounted around the upper outer circumferential portion of the central axis 70. Along the central axis 70, the fixing jig 34c can be moved up and down, although the fixing jig 34c cannot be rotated. A coiled spring 59a is disposed around the outer circumference of the central axis 70 and between the fixing jig 34c and the stand 11b. The disc (B) is mounted on the fixing jig 34c. The upper portion of the disc (B) is pressed by the pressing piece 35b. The pressing piece 35b is provided with a pressurizing plate 66a disposed thereon.

A turntable 73 is disposed on the stand 11b via one pair of bearings 71 and 72. The outer periphery of the turntable 73 is formed into a gear 74 which causes the turntable 73 to rotate with the help of a gear drive mechanism. A plurality of coiled spring 60a are mounted on the turntable 73. A supporting cylinder 61a is disposed on the coiled springs 60a. One pair of bearings 62a and 63a are interposed between the supporting cylinder 61a and the fixing jig 34c.

A cylindrical body 50a is provided, directing vertical, in the vicinity of the outer periphery of the turntable 73. A tapered portion 18c is provided around the inner circumference of the cylindrical body 50a in the vicinity of the upper end portion thereof. A plurality of pressurizing pieces 28b are disposed inside the tapered portion 18c and on the supporting cylinder 61a. An annular pressurizing member 36b is disposed on the pressurizing pieces 28b and between the pressurizing pieces 28b and the pressurizing plate 66a. A bearing 75 is disposed between the pressurizing member 36b and the pressing piece 35b. A bearing 76 is also disposed between the pressurizing member 36b and the pressurizing plate 66a.

The apparatus shown in FIG. 8 is operated as follows: The rotation of the turntable 73 via the gear 74 with the help of a gear drive mechanism allows the rim (A) to rotate together with, for instance, the cylindrical body 50a, the pressurizing member 36b, the pressurizing pieces 28b and the supporting cylinder 61a. At this time, the lowered pressurizing plate 66a causes the disc (B) and the fixing jig 34c to be lowered via the pressing piece 35b. At the same time the pressurizing pieces 28b and the supporting cylinder 61a are also lowered together, while rotating, via the pressurizing member 36b. The pressurizing pieces 28b are contracted, in the course of the lowering, by way of the tapered portion 18c of the cylindrical body 50a to pressurize the rim (A). The description of the subsequent operations will be omitted as they are clear from the preceding preferred embodiments.

Preferred Embodiment 5

In FIG. 9 an explanation will be made on samples of available shapes of projection on the rim (A) and the disc (B). All of the samples in the preferred embodiments which have been described are square in section. As shown in FIGS. 9(a), 9(b) and 9(c), the projection may be trapezoidal, triangular or semicircular in section. As shown in FIGS. 9(d) and 9(e), only either of the rim (A) or the disc (B) can be provided with the projection.

Figure 9A:
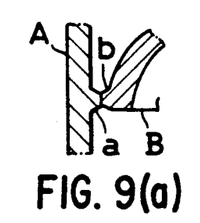
Figure 9B:
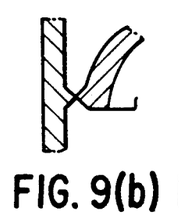
Figure 9C:
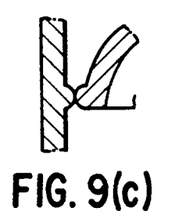
Figure 9D:
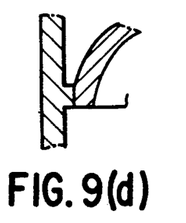
Figure 9E:
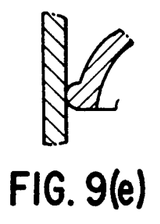
Figure 9F:
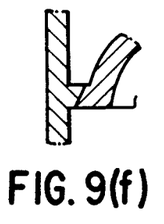
Figure 9G:
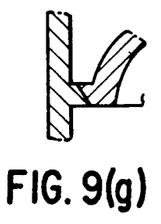

In case both of the rim (A) and the disc (B) are provided with the projection, both of the projections can have slanted joining faces in one direction or in the reverse direction, as shown in FIGS. 9(f) and 9(g). In case the projection has slanted joining faces, the larger angle of the inclination on the joining faces causes to produce the larger joining area, requiring more energy for joining. Consequently the angle of the inclination is preferably 45 degrees or less.

Figure 9H:
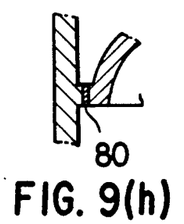
Figure 9I:
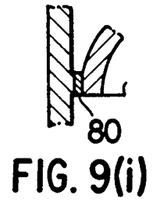
Figure 9J:
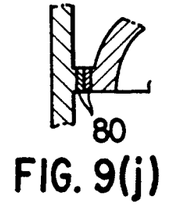

As shown in FIGS. 9(h), 9(i) and 9(j), an insertion 80 can be placed on either of the pressure welding faces or on both of the faces. It is necessary that the thickness of the insertion 80 should be smaller than the upset length of travel at the time of upset pressure applying process. The insertion is pushed out as flash at the time of upset pressure applying process.

Even smooth joining faces can generate sufficient friction heat for joining at the time of friction welding process. Rough joining faces preferably bring about more frictional heat.

In the friction welding method for joining a rim and a disc of a disc wheel and the apparatus therefor according to the present invention, the outer circumference or the inner circumference of either of the materials is firmly fixed almost entirely circumferentially, and one material is pressurized uniformly almost entirely circumferentially to the fixed material in the inner or outer direction via the projection so that the both of the materials can be heated and joined. At this time the pressure is concentrated mainly on the projection. The strain caused by the pressure can scarcely be transmitted to other portions of the materials. Therefore the turning force, the inertia force and the counteracting braking force which are generated at the joining faces are almost absorbed at the joint. The strain-causing force is not easily transmitted to other portions than the joint. The other portions are hard to be deformed. Furthermore, the joining portions are pressurized and welded in the state wherein both the outside and inside materials are firmly pressed, so that joint is also scarcely deformed.

What is claimed is:

1. A friction welding method for joining a rim and a disc of a disc wheel, said rim being an outside material and said disc being an inside material, said inside material being able to be fitted into said outside material, said outside material being provided with a projection around the inside circumference thereof, said projection protruding so that said projection can be opposed to said inside material almost entirely circumferentially when said inside material is fitted into said outside material, comprising the steps of:
   fixing firmly the outer circumference of said outside material almost entirely circumferentially when said inside material is in the state of being fitted into said outside material;
   rotating said inside material; and
   generating frictional heat at a joining face between said outside material and said inside material by pressurizing said inside material to said outside material from the inside of said inside material so as to ensure that both of said outside material and said inside material can be pressurized uniformly via said projection almost entirely circumferentially, while said inside material is rotated.

2. A friction welding method for joining a rim part and a disc part of a disc wheel comprising the steps of:
   providing an annular projection on at least one of said parts;
   disposing said rim part and disc part in a fixing position in which said projection is juxtaposed to said other part;
   rotating said disc part and precluding rotation of said rim part;
   pressing said rim part and said disc part together such that said projection engages and presses against said other part, said step of pressing said disc part and said rim part together comprising applying an outward radial force to said disc part; and
   generating frictional heat between said projection and said other part and thereby effecting friction welding between said rim part and said disc part.

3. A method according to claim 2, wherein said disc part and said rim part have a common axis, said step of applying said outward radial force to said disc part comprises initially applying an axial force to said disc part in a direction parallel to said axis and transforming said axial force to said outward radial force.

4. A method according to claim 3, wherein said step of applying said axial force to said disc part comprises effecting axial movement of said disc part and axial movement of said rim part.

5. A friction welding method for joining a rim part and a disc part of a disc wheel comprising the steps of:
   providing an annular projection on at least one of said parts;
   disposing said rim part and disc part in a fixing position in which said projection is juxtaposed to said other part;
   rotating said disc part and precluding rotation of said rim part;
   pressing said rim part and said disc part together such that said projection engages and presses against said other part, said step of pressing said disc part and said rim part together comprising applying an outward radial force to said disc part; and
   generating frictional heat between said projection and said other part and thereby effecting friction welding between said rim part and said disc part.

6. A method according to claim 5, wherein said disc part and said rim part have a common axis, said step of applying said inward radial force to said rim part comprising initially applying an axial force to said rim part in a direction parallel to said axis and transforming said axial force to said inward radial force.

7. A method according to claim 6, wherein said step of applying said axial force to said rim part comprises effecting axial movement of said rim part and axial movement of said disc part.

8. A friction welding method for joining arm part and a disc part of a disc wheel comprising the steps of:
   providing an annular projection on at least one of said parts;
   disposing said rim part and disc part in a fixing position in which said projection is juxtaposed to said other part;
   rotating said disc part and precluding rotation of said rim part;
   pressing said rim part and said disc part together such that said projection engages and presses against said other part, said step of pressing said disc part and said rim part together comprising applying an outward radial force to said disc part; and generating frictional heat between said projection and said other part and thereby effecting friction welding between said rim part and said disc part.

9. A method according to claim 8, wherein said disc part and said rim part have a common axis, said step of applying said inward radial force to said rim part comprising initially applying an axial force to said rim part in a direction parallel to said axis and transforming said axial force to said inward radial force.

10. A method according to claim 9, wherein said step of applying said axial force to said rim part comprises effecting axial movement of said rim part and axial movement of said disc part.

11. A friction welding method for joining a rim part and a disc part of a disc wheel comprising the steps of:
providing an annular projection on at least one of said parts;
disposing said rim part and disc part in a fixing position in which said projection is juxtaposed to said other part;
rotating said rim part while precluding rotation of said disc part;
pressing said rim part and said disc part together such that said projection engages and presses against said other part, said step of pressing said disc part and said rim part together comprises applying an outward radial force to said disc part; and
generating frictional heat between said projection and said other part and thereby effecting friction welding between said rim part and said disc part.

12. A method according to claim 11, wherein said disc part and said rim part have a common axis, said step of applying said outward radial force to said disc part comprises initially applying an axial force to said disc part in a direction parallel to said axis and transforming said axial force to said outward radial force.

13. A method according to claim 11, wherein said step of applying said axial force to said disc part comprises effecting axial movement of said disc part and axial movement of said rim part.

14. A disc wheel product made according to the method of claim 2.

15. A disc wheel product made according to the method of claim 5.

16. A disc wheel product made according to the method of claim 8.

17. A disc wheel product made according to the method of claim 11.

* * * * *